April 1, 1952     H. P. KALLMANN     2,590,867
NOISE REDUCER IN SCINTILLATION COUNTING
Filed Oct. 5, 1950
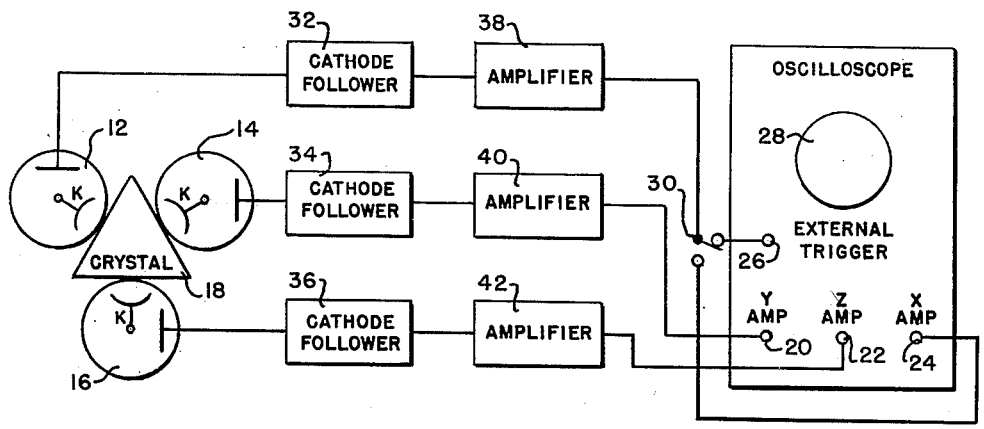
INVENTOR.
HARTMUT P. KALLMANN
BY
Harry M. Saragovitz
Attorney

Patented Apr. 1, 1952

2,590,867

UNITED STATES PATENT OFFICE 2,590,867

NOISE REDUCER IN SCINTILLATION COUNTING

Hartmut P. Kallmann, Bellaire, N. Y., assignor to the United States of America, as represented by the Secretary of the Army Application October 5, 1950, Serial No. 188,633

5 Claims. (Cl. 250—207)

(Granted under the act of March 3, 1883, as amended April 30, 1928; 370 O. G. 757)

The invention described herein may be manufactured and used by or for the Government for governmental purposes, without the payment of any royalty thereon.

This invention relates to noise reducers in scintillation counting and has the object to provide a device which is simple to construct for discriminating between noise pulses and pulses of small light flashes in scintillation counting.

Scintillation counters are now widely used in various branches of research and industry. In research, such devices usually serve to detect and record the number of particles emitted in various experiments involved in the study of nuclear radiation, disintegration and transmutation. Counters are also used in ascertaining whether a bombardment has given rise to a radioactive product, and to determine the nature, the intensity, and the period of the resulting activity. However, a main difficulty in scintillation work is that when light flashes of small intensity are recorded, the counting rate is limited by the number of noise pulses of comparable size occurring in the multiplier itself. These pulses are caused by single electrons released from the photo-cathode of the multiplier tube by thermal collisions; their multiplication in the tube creates a pulse. Experiment has shown that these single electron pulses are not of equal size but exhibit a whole distribution of pulse sizes. Thus, it may occur that pulses produced by a single electron are even ten times larger than the average pulse size produced by single electrons. On the other hand, a pulse induced by the simultaneous emission of ten electrons from the photo-cathode by a light flash undergoes fluctuations, and it may be that its actual pulse height is considerably less than its medium pulse height; therefore, even pulses originating in the simultaneous emission of several electrons cannot be distinguished with certainty from noise pulses.

Other objects and advantages of this invention will be more readily understood from the following description of a device for noise reduction in scintillation counting embodying this invention, as illustrated and explained in the accompanying drawing, where there is shown a block diagram of the noise reducer.

The noise reducer is organized about a small three-faced crystal 18, such as a stilbene crystal. Three photomultipliers 12, 14 and 16 of the 931A type are positioned so that they face the three faces of the crystal 18, so that one photomultiplier is before each face. Multiplier 12 is connected to a single pole double throw switch 30 through conventional cathode follower and pulse amplifier circuits 32 and 38. One position of switch 30 is connected to the external trigger input jack 26 of a conventional oscilloscope 28. The second position of switch 30 is connected to the X-axis amplifier input jack 24 of the oscilloscope 28. Photomultiplier 14 is connected through conventional cathode follower and pulse amplifier circuits 34 and 40 to the Y-axis amplifier input jack 20 of the oscilloscope 28. Photomultiplier 16 is connected through conventional cathode follower and pulse amplifier circuits 36 and 42 to the Z-axis intensity amplifier input jack 22 of the oscilloscope 28.

The crystal 18 is excited by external radiation, and when so excited, small light flashes are created which emit their light simultaneously to the three different photomultipliers 12, 14 and 16 through the three faces of the crystal 18. The faces of the crystal 18 are chosen so that all light proceeding from them can geometrically enter each photomultiplier window.

In operation, when the switch is in the position to connect multiplier 12, called the "X" multiplier, to the external trigger jack 26 of the oscilloscope (as shown in the drawing), the pulse from the "X" multiplier triggers a sweep in the X direction, thereby giving deflection independent of the pulse intensity. For convenience, this position of switch 30 is called position A. When the switch is in the position to connect the "X" multiplier 12 to the X-axis amplifier input jack 24 of the oscilloscope, a deflection is caused in the X direction. This deflection is produced by the pulse itself so that the X deflections are proportional to the pulse intensity. For convenience, this position of switch 30 is called position B. Multiplier 14, called the "Y" multiplier, causes deflections of the cathode-ray beam in the Y direction. Multiplier 16, called the "Z" multiplier, regulates the cathode-ray beam intensity according to the size of its pulses.

The cathode-ray beam operates simultaneously in all three directions only if all three multipliers produce a pulse at the same time and only then a deflection of the beam in the Y direction is to be seen when the switch is at position A. When the switch is at position B, a light flash is registered by the simultaneous action of all three multipliers 12, 14 and 16 producing a simultaneous deflection in the Y and X directions and a simultaneous increase of the beam intensity. Without a pulse in the "Z" multiplier, the intensity of the beam would be too low to be seen on the screen. Since noise pulses occur independently of each other in all three multipliers, if no pulse occurs in the "Z" multiplier circuit, there will be no beam on the screen at all. If within the short period of the duration of the "Z" multiplier pulse, pulses occur in the "X" and "Y" multiplier circuits, a deflection of the beam similar to that caused by a light flash is seen. Since the triple coincidence of independent noise pulses within the short duration in all three multipliers is a very rare event, it is possible to discriminate sharply between pulses of noise and light flashes.

Noise pulses occurring in the three multipliers are entirely distributed at random and are independent of each other. If the duration of a pulse is given by T, and if the number of noise pulses per second is described as $n$, the probability of noise pulses occurring in two multipliers simultaneously is given by $nT$ and that of noise pulses coinciding in all three multipliers is given by $(nT)^2$.

From this it follows that the number of accidental triple coincidences or the number of events caused by noise pulses in which all three multipliers operate simultaneously in given by $n(nT)^2$, with $nT$ sufficiently small, as is usually the case. The number of triple coincidences caused by noise pulses is therefore much smaller than the noise number in one single tube.

If, however, some exterior radiation induces a light flash in the crystal, this will induce pulses in all multipliers at the same time, therefore, the number of light flashes counted in not reduced by this device. By this device light flashes of small intensity proceeding from the crystal 18 can easily be counted even if noise pulses are much more frequent than the light flashes. With a pulse duration of $10^{-6}$ second and a noise number of 1000 per second, the number of counted noise pulses is reduced by a factor of $10^{-6}$, this means that only after 1000 seconds, one accidental triple coincidence occurs in the device. Exterior radiation with such a small counting rate could be deflected by this device.

The invention is not only operable with one single crystal but also with different crystals excited by the same radiation. In this case each multipler is excited by a different crystal. The noise pulses are eliminated in the same ratio as previously described since only pulses are recorded in which all multipliers operate simultaneously. In this case not only three but a great number of crystals may be used and connected to the Y axis over delay lines with different time delay. For example, a fourth multiplier can be introduced which operates, for instance, on the Y axis with a certain time delay. Then a light flash is indicated by a double pulse with a given time shift on the screen, and only four noise pulses coincidentally occurring would produce a similar record as a light flash. Using position A all added multipliers excite deflection in the Y direction which are seen on the screen with different fixed distances on the driven sweep. In this way one photographic picture of the light emission of different crystals energized, for instance, by one event of cosmic radiation can be taken. A similar arrangement can be used for many crystals in case of position B; the pulses of different crystals are then fed to the plus and minus Y and plus and minus X axis with equal time delays. In this way the light flashes proceeding from nine crystals can be recorded simultaneously on one picture.

The limit of this method is given by the intensity of the light which hits the photo-cathode of the different multipliers. If the light intensity hitting the photo-cathodes from one light flash is so small that each light flash does not release one electron, then the number of counted light flashes will decrease. Only when the light flashes release at an average at least one electron is there no decrease in the number of counted light flashes. If the probability that one light flash releases one electron is given by P and if this number is smaller than one, then the number of counted light flashes is dimished by a factor of $P^2$. Nevertheless, this method of triple coincidence will be advantageous as long as the factor P which diminishes the number of counted light flashes is larger than the factor $nt$ which diminishes the number of noise pulses.

Other devices than an oscilloscope may be employed as the indicating device, such as an electron switching tube.

Various other modifications may be made without departing from the spirit of the invention.

Having described the invention, what is claimed is:

1. A noise reducer in scintillation counting comprising a three-faced crystal excitable by exterior radiation, a photomultiplier positioned before each face of said crystal, a cathode follower connected to the output of each of said photomultipliers, a pulse amplifier connected to each of said cathode followers, indicating means having its input connected to the output of each of said pulse amplifiers.

2. A noise reducer of the type described in claim 1 where said indicating means consists of an oscilloscope having an X-axis amplifier input, a Y-axis amplifier input, and a Z-axis intensity amplifier input, the pulses from one of said pulse amplifiers being fed into said X-axis amplifier input, the pulses from the second of said pulse amplifiers being fed into said Y-axis amplifier input, and the pulses from the third of said pulse amplifiers being fed into said Z-axis intensity amplifier input.

3. A noise reducer of the type described in claim 1 where said indicating means consists of an oscilloscope having a Y-axis amplifier input, a Z-axis intensity amplifier input and an external trigger input, the pulses from one of said pulse amplifiers being fed into said Y-axis amplifier input, the pulses from the second of said pulse amplifiers being fed into said Z-axis intensity amplifier input, and the pulses from the third of said pulse amplifiers being fed into said external trigger input.

4. A noise reducer of the type described in claim 1 having a single pole double throw switch connected to the first of said pulse amplifiers, where said indicating means consists of an oscilloscope having an X-axis amplifier input, a Y-axis amplifier input a Z-axis intensity amplifier input, and an external trigger input, one position of said switch being connected to said external trigger input and the other position of said switch being connected to said X-axis amplifier input, said second and third pulse amplifiers being connected to said Y-axis amplifier input and said Z-axis intensity amplifier input respectively.

5. A noise reducer in scintillation counting comprising a crystal excitable by exterior radiation for generating corresponding flashes of light, a plurality of translating paths for said flashes of light, each path comprising a face of said crystal and photoelectric means associated therewith to provide a similar plurality of sources of electrical pulses, and means for combining the outputs of all of said photoelectric means to produce an output pulse signal for each light flash and effectively to inhibit an output signal generated by noise.

HARTMUT P. KALLMANN.

REFERENCES CITED

The following references are of record in the file of this patent:

UNITED STATES PATENTS

| Number | Name | Date |
|---|---|---|
| 2,554,933 | Wouters | May 29, 1951 |